US012114118B2

(12) United States Patent
Huyck et al.

(10) Patent No.: US 12,114,118 B2
(45) Date of Patent: Oct. 8, 2024

(54) AUDIO DEVICE HOUSING

(71) Applicant: Shure Acquisition Holdings, Inc., Niles, IL (US)

(72) Inventors: Benjamin Neal Huyck, Chicago, IL (US); Gregory William Lantz, Geneva, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 236 days.

(21) Appl. No.: 17/572,178

(22) Filed: Jan. 10, 2022

(65) Prior Publication Data

US 2022/0225001 A1 Jul. 14, 2022

Related U.S. Application Data

(60) Provisional application No. 63/136,924, filed on Jan. 13, 2021.

(51) Int. Cl.

*H04R 1/00* (2006.01)
*H04R 1/02* (2006.01)
(Continued)

(52) U.S. Cl.

CPC ............. *H04R 1/083* (2013.01); *H04R 1/023* (2013.01); *H04R 1/406* (2013.01); *H04R 2201/021* (2013.01)

(58) Field of Classification Search

CPC ........ H04R 1/083; H04R 1/023; H04R 1/406; H04R 1/086; H04R 1/32; H04R 1/326;
(Continued)

(56) References Cited

U.S. PATENT DOCUMENTS 4,503,292 A 3/1985 Johnson
4,727,587 A * 2/1988 Black .................... H04R 1/025 174/491
(Continued)

FOREIGN PATENT DOCUMENTS

CN 208691470 4/2019
CN 211976390 U * 11/2020
(Continued)

OTHER PUBLICATIONS

International Search Report and Written Opinion for PCT/US2022/011850 dated Jun. 15, 2022, 19 pp.
(Continued)

*Primary Examiner* — Edgardo San Martin
(74) *Attorney, Agent, or Firm* — Neal, Gerber & Eisenberg LLP

(57) ABSTRACT

An audio device includes a circular cover comprising a top and a bottom, a circular screen rotationally engaged with the bottom of the cover, and a circular shroud removably engaged with top of the cover. The top of the cover includes a plurality of mounting holes. The mounting holes may include a plurality of holes in a VESA pole mounting pattern. The mounting holes may also include a plurality of cable mounting holes configured in a square pattern having greater spacing than the VESA mounting pattern. The audio device may include a plurality of microphones and/or one or more loudspeakers.

16 Claims, 13 Drawing Sheets

(51) Int. Cl.

| | |
|---|---|
| ***H04R 1/08*** | (2006.01) |
| ***H04R 1/32*** | (2006.01) |
| ***H04R 1/40*** | (2006.01) |

(58) Field of Classification Search
CPC ... H04R 1/40; H04R 1/02; H04R 1/08; H04R 1/2892; H04R 2201/021; H04R 2201/02
See application file for complete search history.

(56) References Cited

U.S. PATENT DOCUMENTS

| | | | | |
|---|---|---|---|---|
| 4,891,842 | A * | 1/1990 | Green | H04R 1/2888 181/150 |
| 7,660,428 | B2 | 2/2010 | Rodman | |
| D652,025 | S | 1/2012 | Deberard | |
| 8,672,087 | B2 * | 3/2014 | Stewart, Jr. | H04R 1/025 181/150 |
| 9,516,412 | B2 | 12/2016 | Shigenaga | |
| 9,565,493 | B2 | 2/2017 | Abraham | |
| 9,747,454 | B2 | 8/2017 | Shigenaga | |
| 9,813,806 | B2 | 11/2017 | Graham | |
| 9,866,952 | B2 | 1/2018 | Pandey | |
| 9,973,846 | B2 | 5/2018 | Fukuda | |
| 10,206,030 | B2 | 2/2019 | Matsumoto | |
| 10,244,162 | B2 | 3/2019 | Sawa | |
| 10,433,086 | B1 | 10/2019 | Juszkiewicz | |
| 10,536,681 | B2 | 1/2020 | Sawa | |
| 10,631,085 | B2 | 4/2020 | Kirkpatrick | |
| 10,694,285 | B2 | 6/2020 | McCowan | |
| 10,911,849 | B2 * | 2/2021 | Ivey | H04R 1/023 |
| 11,064,291 | B2 * | 7/2021 | Rollow, IV | H04R 1/406 |
| D943,552 | S * | 2/2022 | Miller | D14/222 |
| D944,776 | S * | 3/2022 | Miller | D14/222 |
| 11,303,981 | B2 * | 4/2022 | Lantz | E04B 9/0435 |
| 11,310,592 | B2 * | 4/2022 | Abraham | H04R 1/406 |
| 11,523,212 | B2 * | 12/2022 | Ansai | H04R 19/04 |
| 2010/0314513 | A1 * | 12/2010 | Evans | F16M 13/027 248/217.4 |
| 2019/0301727 | A1 | 10/2019 | Sieczkowski | |
| 2020/0137485 | A1 | 4/2020 | Yamakawa | |
| 2021/0044881 | A1 * | 2/2021 | Lantz | E04B 9/0428 |
| 2021/0250684 | A1 * | 8/2021 | Sonogi | H04R 1/086 |
| 2022/0256281 | A1 * | 8/2022 | Marash | H04R 1/406 |
| 2023/0047408 | A1 * | 2/2023 | Nighman | H04R 5/027 |

FOREIGN PATENT DOCUMENTS

| | | | | |
|---|---|---|---|---|
| CN | 112367579 | A * | 2/2021 | H04R 1/083 |
| CN | 112993651 | A * | 6/2021 | H01R 13/5202 |
| CN | 115052232 | A * | 9/2022 | |
| EP | 2928206 | | 10/2015 | |
| JP | H0644231 | Y2 * | 11/1994 | |
| JP | 2014236346 | | 12/2014 | |
| JP | 2015012562 | | 1/2015 | |
| WO | 2015151131 | | 10/2015 | |
| WO | WO-2016134596 | A1 * | 9/2016 | |

OTHER PUBLICATIONS

Audix, Flush-Mount Ceiling Microphone—White, Information Sheet, 2022, 3 pp.

ClearOne, Ceiling Microphone Array, Product Overview, 2022, 5 pp.

McMurray, "Sony unveils beamforming ceiling mic," Installation, Feb. 19, 2020, 3 pp.

Shure_MXA910, MXA910-60CM, MXA910W-A, MXA910W-US, Ceiling Array Microphone, User Guide, 2020, 59 pp.

Sony, MAS-A100 Beamforming Microphone, Operating Instructions, 2020, 33 pp.

Stem Audio, Ceiling User Manual, Date unknown but believed to be as early as Mar. 25, 2020, 2 pp.

Community Professional Loudspeakers, D Series, Pendant Loudspeakers, 2016, 8 pp.

Invitation to Pay Additional Fees for PCT/US2022/011850 dated Apr. 25, 2022, 11 pp.

* cited by examiner

AUDIO DEVICE HOUSING

CROSS-REFERENCE

This application claims priority to U.S. Provisional Application No. 63/136,924, filed on Jan. 13, 2021, the contents of which are incorporated herein by reference in their entirety.

FIELD

The field of the invention audio devices. More specifically, the field of the invention is related to ceiling-mounted audio devices.

BACKGROUND

Audio devices are increasingly mounted on ceilings, especially in commercial and office environments. These audio devices include loudspeakers and microphones, including microphone arrays. Applications include teleconferencing, voice lift (amplifying a person's voice for the benefit of others in a larger room), and audio recording lectures and meetings. A ceiling-mounted audio device should be aesthetically pleasing and mechanically robust.

SUMMARY

An audio device includes a circular cover comprising a top and a bottom, a circular screen rotationally engaged with the bottom of the cover, and a circular shroud removably engaged with top of the cover. The top of the cover includes a plurality of mounting holes. The mounting holes may include a plurality of holes in a VESA pole mounting pattern. The mounting holes may also include a plurality of cable mounting holes configured in a square pattern having greater spacing than the VESA mounting pattern. The audio device may include a plurality of microphones and/or one or more loudspeakers.

The cover may include a plurality of rotational slots configured to rotationally engage with a plurality of tabs on the screen. The audio device may also include a plurality of brackets fixed to the bottom of the cover, where each of the brackets includes one of the rotational slots. The brackets may also include a feature configured to support a mounting plate. One of the brackets may be an orientation bracket, where the orientation bracket is wider than the other brackets, and one of the tabs on the screen is configured to engage only with the rotational slot of the orientation bracket. A fastener may secure the screen against rotationally disengaging from the cover. The brackets may be fixed to the cover with adhesive or fasteners.

The screen of the audio device may include a circular edge. The circular edge may include a radius, where the radius forms an overlapping joint with the cover when the screen is rotationally engaged with the cover. The radius may traverse an angle greater than 90 degrees relative to a plane tangent to a bottom of the screen.

The shroud of the audio device may include two removably engaged halves, which may be identical. The shroud may include a hole configured to admit a VESA mounting pole. The shroud may include through-holes or slots having the same square pattern as the cable mounting holes. The shroud may include a plurality of elastic members that removably engage with some of the mounting holes in the top of the cover.

An audio device kit may include an audio device that includes a circular cover comprising a top and a bottom, a circular screen rotationally engaged with the bottom of the cover, and two circular shrouds configured to removably engage with top of the cover. The top of the cover includes a plurality of mounting holes. The first circular shroud may configured to admit a VESA pole and the second circular shroud may be include a plurality of holes configured for a plurality of mounting cables to engage with top of the cover.

DETAILED DESCRIPTION

Figure 1:
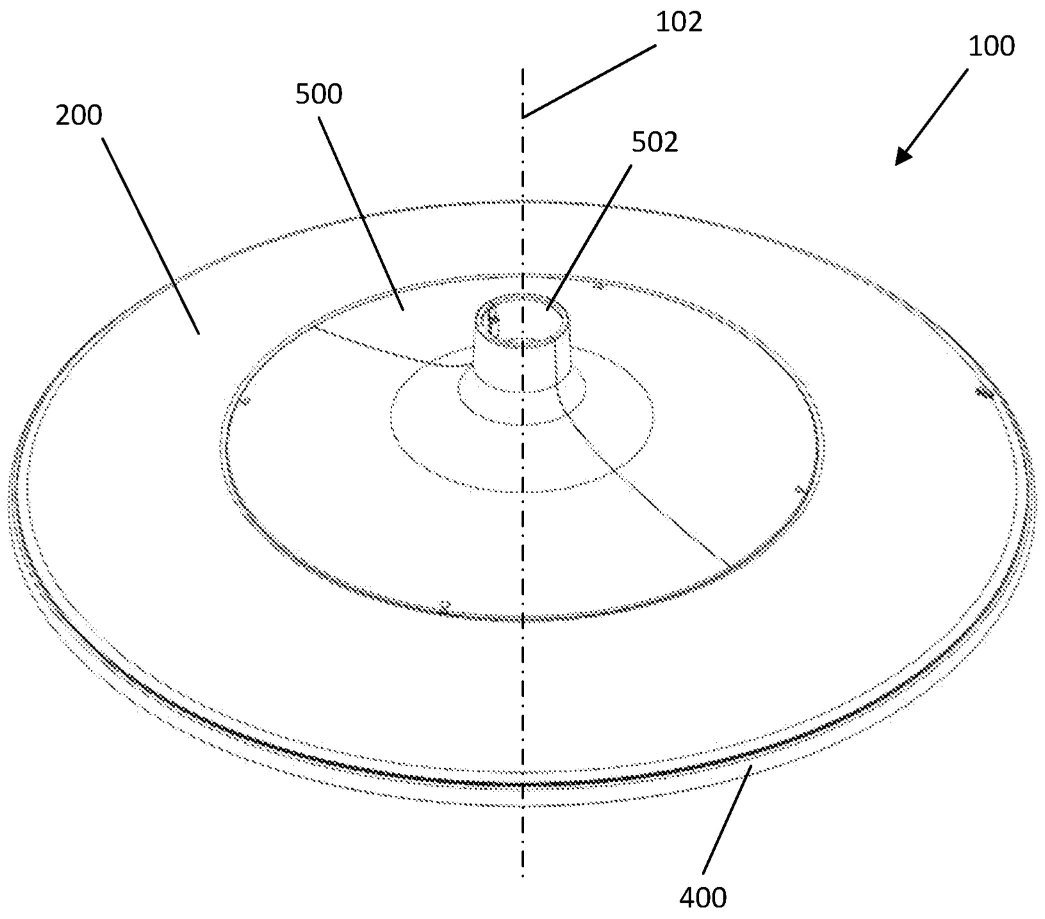
FIG. 1 is an illustration of one example of a ceiling-mounted audio device, in accordance with the present disclosure.

Referring now to the Figures, in which like reference numerals represent like parts, various embodiments of the computing devices and methods will be disclosed in detail.

FIG. 1 is an illustration of one example of a ceiling-mounted audio device 100 comprising a circular cover 200, circular screen 400, and a circular shroud 500. The shroud 500 may be a pole mount shroud (shown), a suspension shroud 600, or of another type. The pole mounting shroud 500 is configured to accept a mounting pole (not shown) through a mounting hole 502. The mounting hole 502 may be circular to accept a cylindrical mounting element such as a pipe or a VESA pole, as will be understood by those skilled in the art. Likewise, the mounting hole 502 may have a non-circular shape to accommodate a non-cylindrical mounting element, such as an oval, square, or rectangle.

Figure 2:
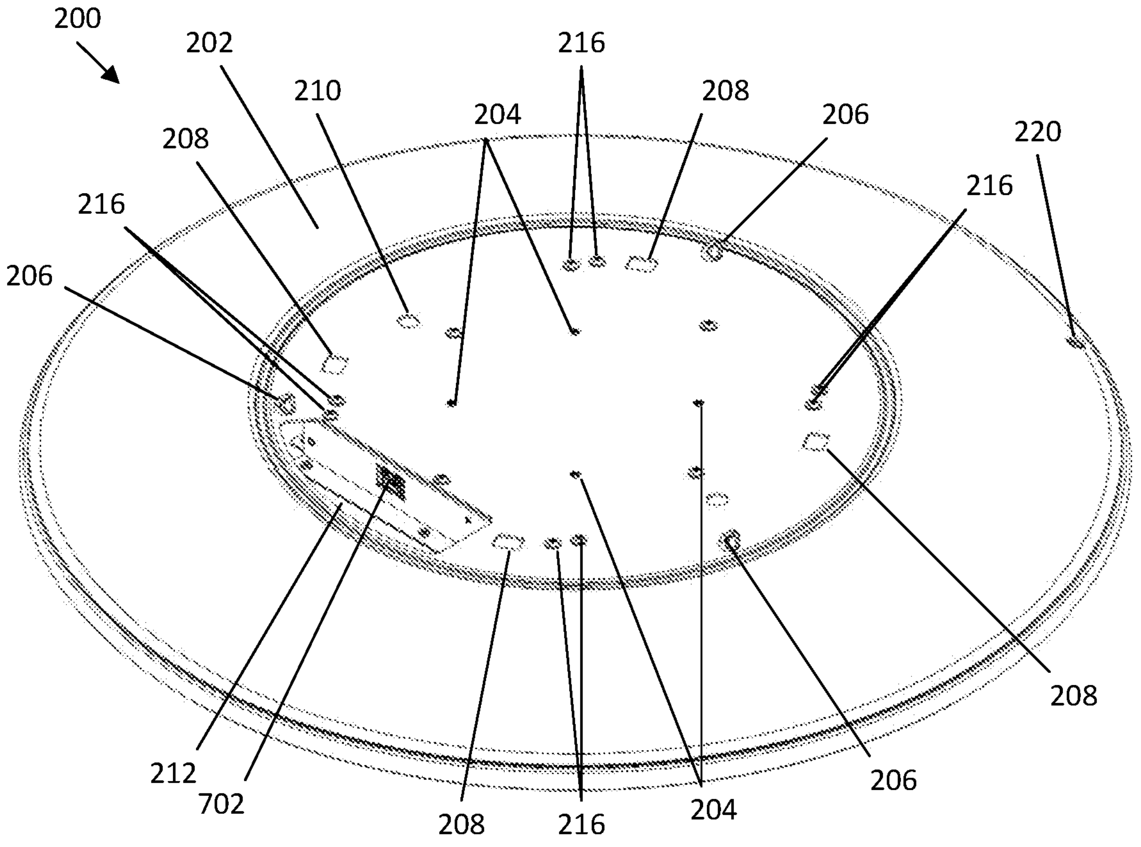
FIG. 2 is an illustration of an example of the ceiling-mounted audio device with the shroud removed to show the details of the top of the cover, in accordance with the present disclosure.

FIG. 2 is an illustration of an example of the ceiling-mounted audio device 100 with the shroud removed to show the details of the top 202 of the cover 200. In this example the cover 200 includes a variety of mounting features for suspending the audio device 100 from the ceiling. The illustrated mounting features include a group of pole mounting holes 204. The pole mounting holes 204 are configured to suspend the audio device 100 from the ceiling by attaching a bracket. The pole mounting holes 204 are positioned in a hole pattern appropriate for attaching a bracket to the top 202 of the cover. The bracket may be a rigid plate with a single hole pattern, a variety of holes patterns (including slotted holes for flexibility), or an adjustable bracket with flexible or hinged legs that can be adjusted to match the pattern of the pole mounting holes 204. The pattern of pole mounting holes 204 may conform to an industry standard, such as those published by VESA, an international non-profit corporation that supports and sets industry-wide interface standards for the PC, workstation, and consumer electronics industries. The pole mounting holes 204 may be threaded or may be through-holes. If the pole mounting holes 204 are through-holes, they may be circular, slotted, square, or rectangular to accommodate appropriate mounting hardware such as conventional screws and nuts, carriage bolts, clip-on sheet-metal (e.g. Tinnerman®) nuts, and other mounting hardware, without limitation, as will be understood by those skilled in the art. While the example in FIG. 2 illustrates pole mounting holes 204, in other examples the holes could be replaced by other types of mounting features, such as threaded studs, pins, standoffs, or other mechanical mounting features as will be understood by those skilled in the art.

The illustrated mounting features also include suspension mounting lugs 206. The suspension mounting lugs 206 are positioned in a different hole pattern than the pole mounting holes 204. In the illustrated example, the hole pattern of the suspension mounting lugs 206 is larger than the hole pattern of the pole mounting holes 204. The suspension mounting lugs 206 are configured to accept the attachment of suspension elements to suspend the audio device 100 from the ceiling. The suspension elements may be cables, ropes, chains, or rods, as may be understood by those skilled in the art. Alternately, the suspension mounting lugs 206 may take any of the forms described above for the pole mounting holes 204 (e.g. threaded holes, through-holes, studs, pins, standoffs, etc.) as will be understood by those skilled in the art.

The illustrated mounting features also include shroud mounting holes 208. The shroud mounting holes 208 are configured to attach the hard-mounting shroud 500 or the suspension shroud 600. The illustrated shroud mounting holes 208 are rectangular through-holes designed to accommodate elastic members that snap into place, as described further below. However, in other examples, the shroud mounting holes 208 may take any of the forms described above for the pole mounting holes 204 (e.g. threaded holes, through-holes, studs, pins, standoffs, etc.) as will be understood by those skilled in the art.

The example cover 200 illustrated in FIG. 2 also includes slots 210 for mounting the unit on a test fixture in the factory. Although the illustrated slots 210 are circular, other shapes, such as keyhole shapes, may be suitable, as will be understood by those skilled in the art. The example cover 200 illustrated in FIG. 2 also includes a fixing hole 220 that provides access for securing the orientation between the cover 200 and the screen 400, as described in more detail below.

The example cover 200 illustrated in FIG. 2 also includes a cable access hole 212. The cable access hole 212 allows data and/or power cables to be connected to the audio device 100 while concealed from view by the shroud 500 and without mechanically interfering with the shroud 500. In the illustrated example, a single RJ-45 type port 702 is illustrated for both data and power (Power over Ethernet, "PoE") connectivity. However, other examples may have multiple ports for data and power, conforming to a variety of industry standards, as will be understood by those skilled in the art.

The example cover 200 illustrated in FIG. 2 also include a group of electronics mounting holes 216. The electronics mounting holes are configured to attach audio device electronics 700 to the bottom 214 of the cover. Examples of audio device electronics include digital signal processors (DSPs), microphones or microphone arrays, and loudspeakers and combinations of the three. Although the audio device electronics in FIG. 2 are attached with screws 216, many other types of attachment may be possible, as will be understood by those skilled in the art. Although FIG. 2 illustrates all of the mounting features described above, other examples may omit or modify the mounting features described, or add additional mounting features.

Figure 3:
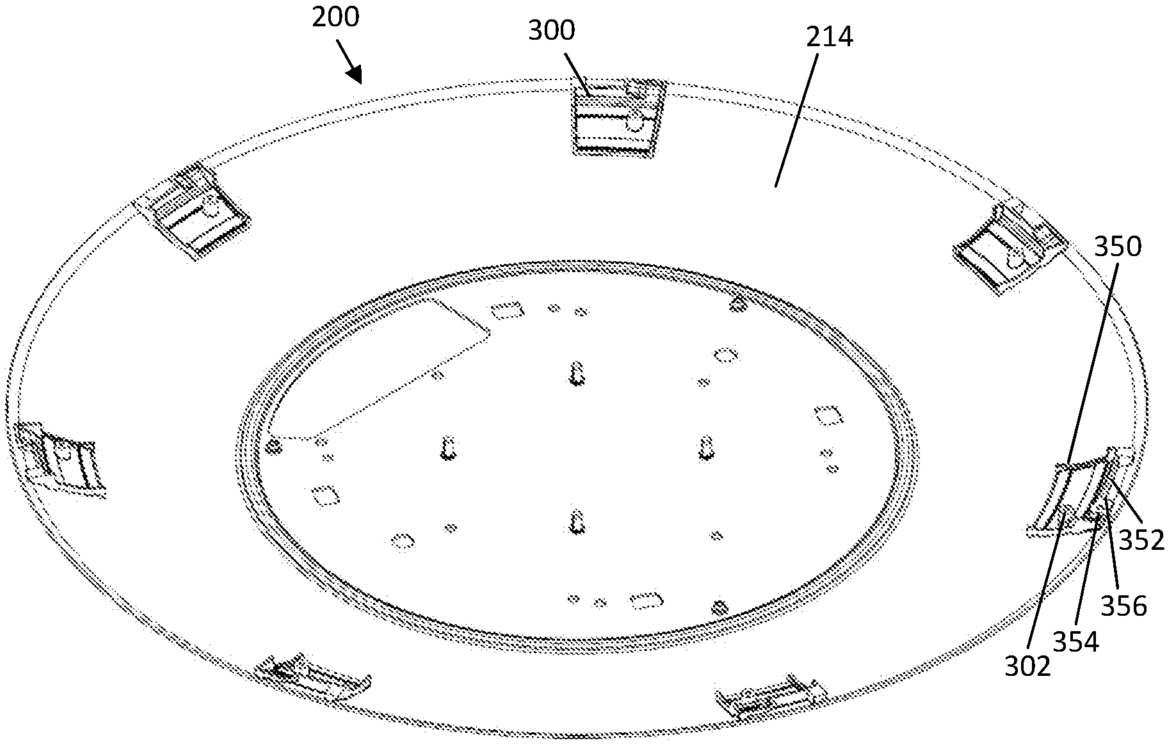
FIG. 3 illustrates the bottom of the cover with the mounting brackets attached, in accordance with the present disclosure.

FIG. 3 illustrates the bottom 214 of the cover 200 with the mounting brackets 300 attached. The mounting brackets 300 may be attached by adhesive, mechanical fasteners, welding, or other conventional means, as will be understood by those skilled in the art. The number and spacing of the brackets 300 may be influenced by the acoustical design of the audio device. For instance, the illustrated example includes seven brackets with equal circumferential spacing. In this example, the audio device may include an array of microelectromechanical (MEM) microphones configured in a layout of concentric rings on a printed circuit board (PCB). Specifically, the MEM microphones may be configured in numbers of 7 or divisible by 7 along the concentric rings. This equal spacing of the seven brackets 300 may reduce or eliminate acoustic interference due to the MEM mic locations on the large PCB. The MEM microphones may be configured in various other layouts as well.

Figure 4:
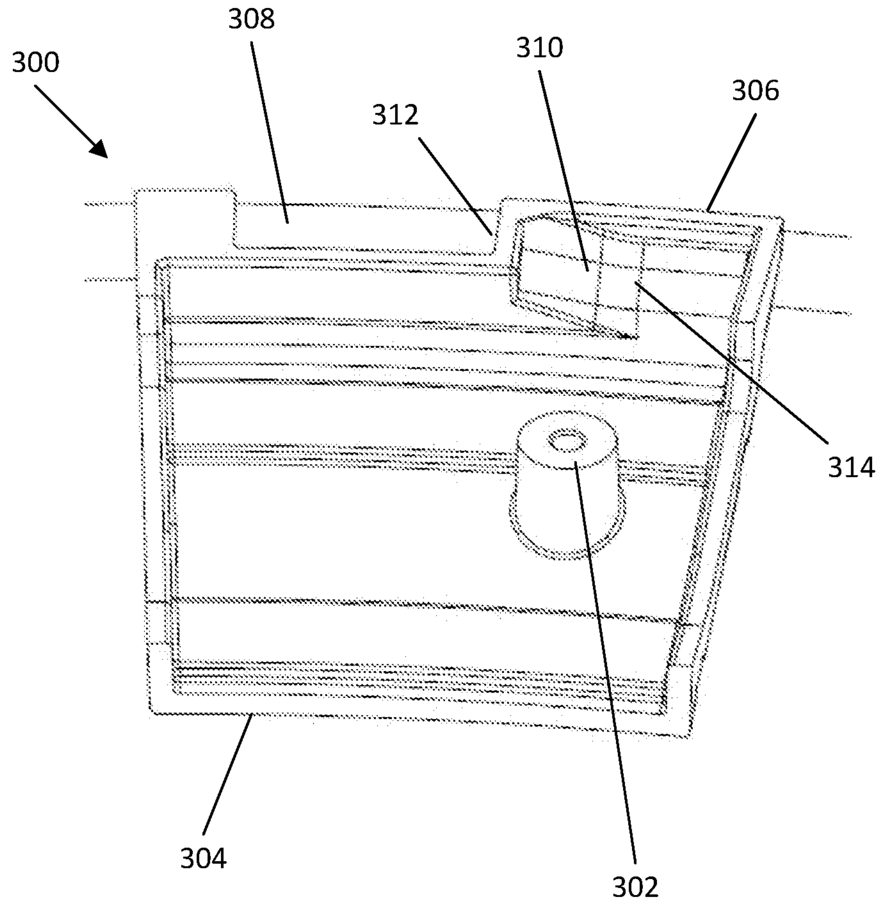
FIG. 4 illustrates a detailed image of a mounting bracket, in accordance with the present disclosure.

FIG. 4 illustrates a detailed image of a mounting bracket 300. Each bracket 300 includes a peripheral mounting point 302, an inner edge 304, and a peripheral edge 306. The peripheral edge 306 is interrupted by a slot 308. The slot 308 is configured to accept a tab 402 on the screen 400. The bracket 300 also includes a ramp 310 proximal to the slot 308. The ramp 310 is configured such that the clearance between the ramp 310 and the bottom 214 of the cover 104 gradually decreases between the leading edge 312 of the ramp and trailing edge 314 of the ramp. When a tab 402 from the screen 400 is engaged between the bracket 300 and bottom 214 of the cover 200, the decreasing clearance between the ramp 310 and the cover 200 causes the tab 402 to be firmly engaged with both the bracket 300 and the cover 200, e.g. wedged.

The peripheral edge 306, slot 308, and ramp 310 are all configured for the tabs 402 of the screen 400 to rotationally engage with the cover 200 and brackets 300. This rotational engagement occurs as follows: (1) the circular screen 400 is aligned with the circular cover 200 so that they share a common axis 102 with the screen proximate to the bottom 214 of the cover; (2) the screen 400 is rotated so that its tabs 402 align with the slots 308 of the brackets 300; (3) the screen 400 is advanced toward the cover 200 so that the tabs 402 pass through the slots 308; (4) the screen 400 is rotated so that the tabs 402 advance from the leading edges 312 of the ramps toward the trailing edges 314 of the ramps 310, causing the tabs 402 to become wedged between the ramps 310 and the bottom 214 of the cover 200; and (5) the rotational orientation between the cover 200 and the screen 400 is fixed by at least one fixing point 354.

In the example illustrated in FIG. 3, there are seven brackets 300. Six of these brackets are identical, but the seventh bracket is slightly different. This orientation bracket 350 is larger than the other brackets 300 and has an orientation slot 352 that is larger than the other slots 308. The larger orientation slot 352 cooperatively engages with an orientation tab 450 on the screen 700. The orientation tab 450 is larger than the other tabs 402 and so will only engage with the orientation slot 352 on the orientation bracket 350. In this way the orientation between the screen 400 and the cover 200 can be controlled and limited to a single orientation. In this example, the screen 400 has a single correct orientation determined by the location of an LED lightpipe slot 420, which should align with an LED PCB mounted to the cover 200. The orientation bracket 350 also includes a ramp 356 that has a slope similar to or the same as the slope of the ramps 310 on the other brackets 300.

In this example the orientation bracket 350 includes a mounting point 302 but also includes a fixing point 354. In the illustrated example the fixing point 354 is a threaded hole to accept a set screw 800. The orientation tab 450 includes a notch 452 configured to avoid interfering with the set screw 800. When the set screw 800 is inserted and tightened against the screen 400 through the fixing hole 220 in the back of the cover 200 the rotational orientation between the cover and the screen is fixed. Those skilled in the art will understand that other conventional fixing means could be used.

In another example (not shown), the brackets 300 could all be the same or identical, each bracket including both a peripheral mounting point 302 and a fixing point 354. In this example, the set screw 800 would be inserted in the fixing point 354 into the bracket 350 that was aligned with the fixing hole 220.

Figure 5:
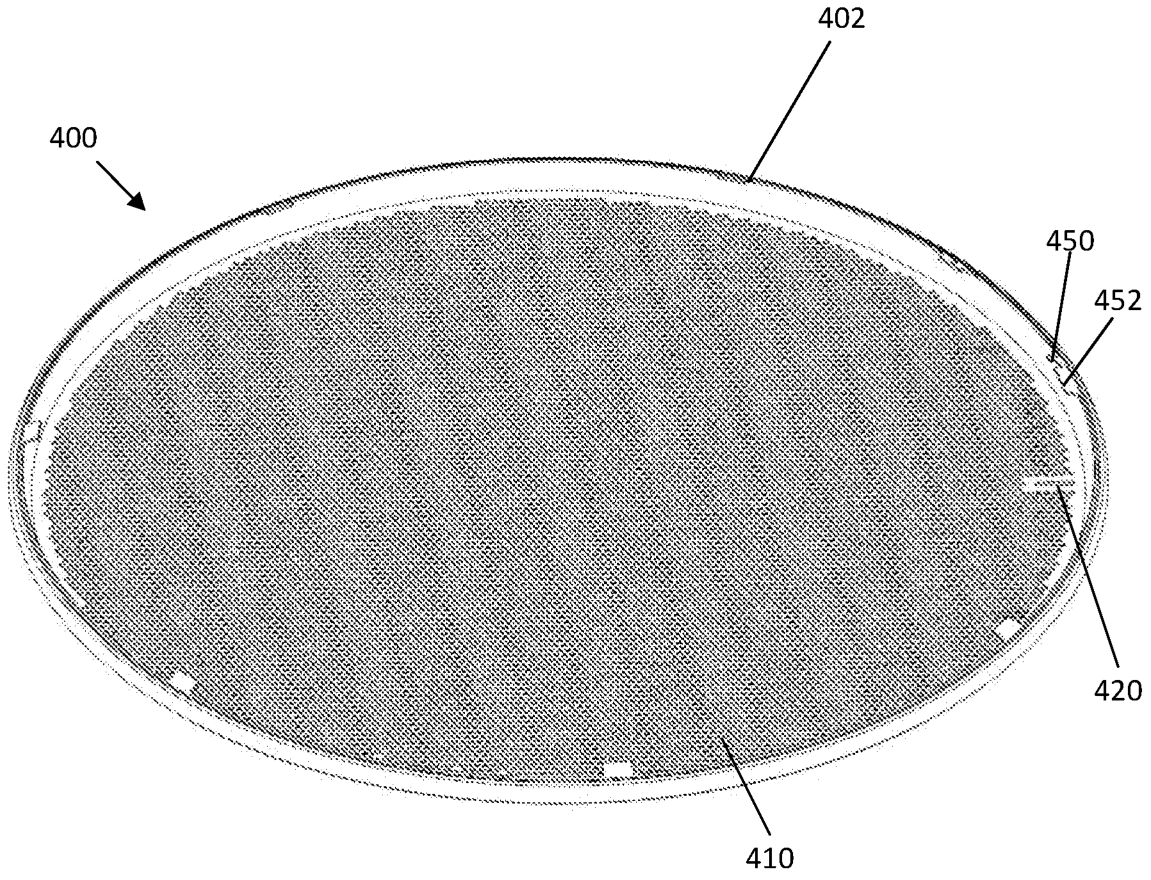
FIG. 5 is an illustration of one example of the screen, in accordance with the present disclosure.

FIG. 5 is an illustration of one example of the screen 400. The screen includes a number of tabs 402 that engage with the slots 308 on the brackets 300, as explained above. The screen also includes an orientation tab 450 that engages with an orientation slot 352 on an orientation bracket 350, as explained above. The screen 400 may be made of metal, for example formed, cast, or machined aluminum, or another metallic alloy. Alternately the screen 400 may be of polymeric construction. The screen 400 is acoustically transparent. In the illustrated example, the screen 400 includes numerous perforations 410 to achieve acoustical transparency. In other examples the screen may achieve acoustic transparency in other ways, for example speaker cloth stretched over the screen 400.

Figure 6:
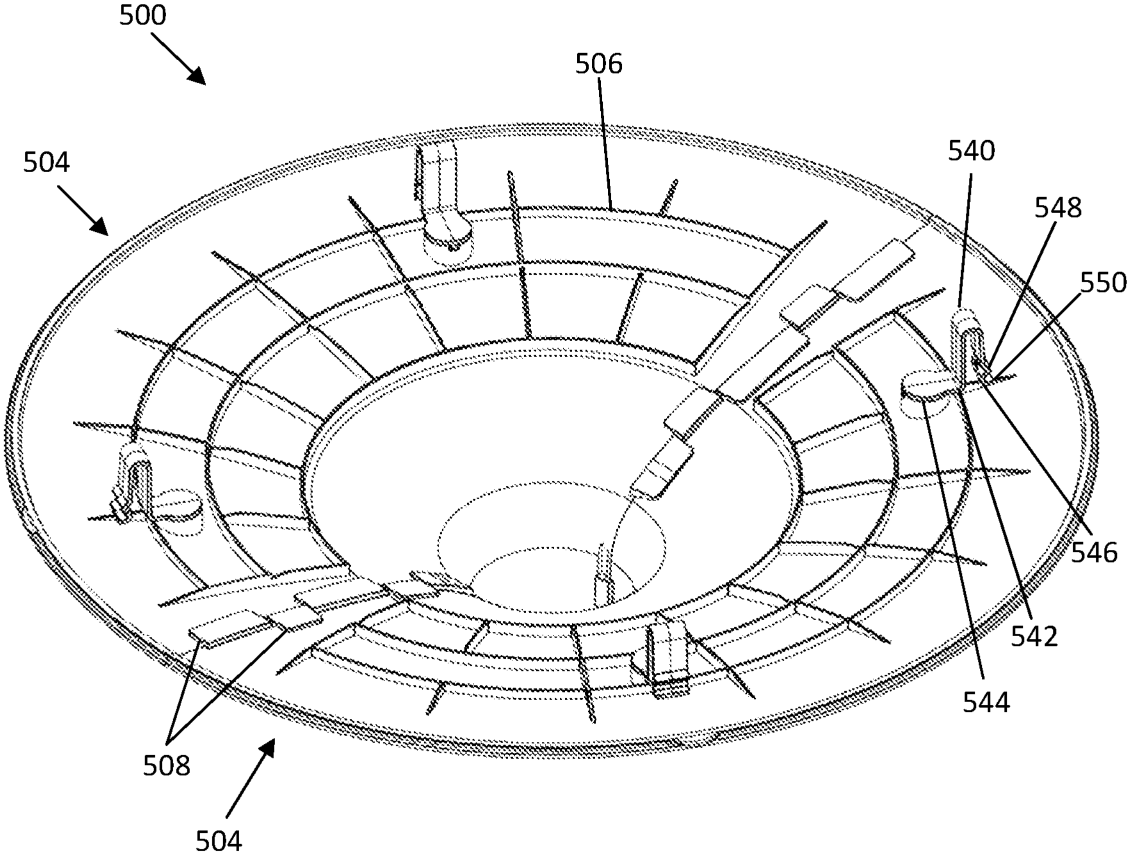
FIGS. 6-8 illustrate of one example a pole mount shroud, in accordance with the present disclosure.
Figure 7:
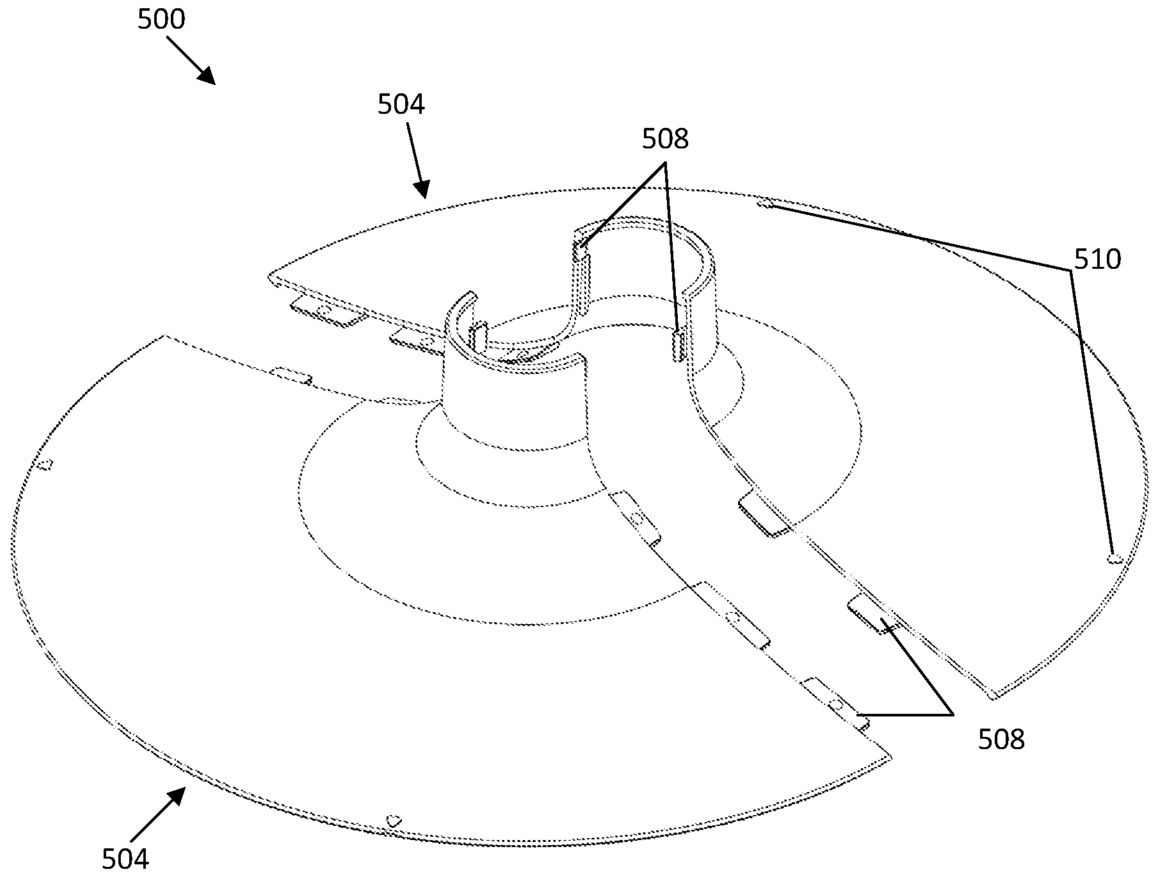
Figure 8:
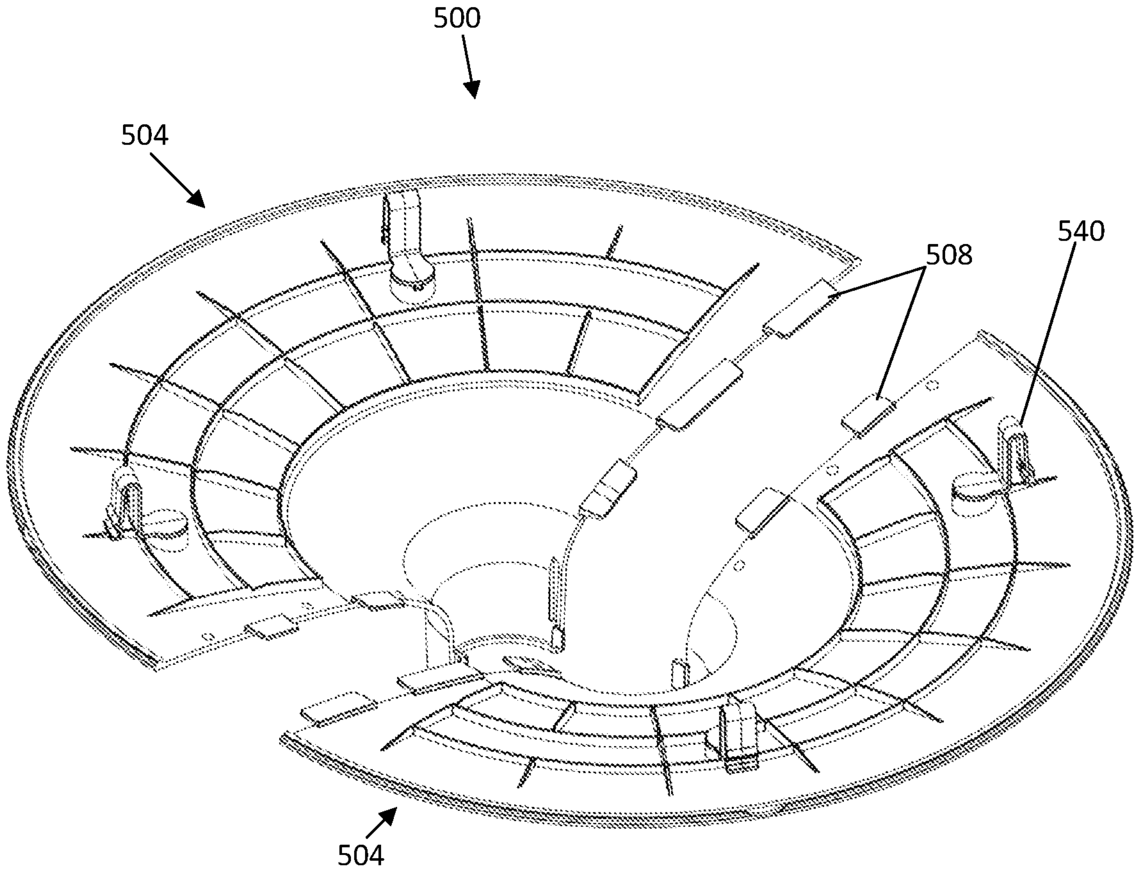

FIG. 6-8 illustrate of one example a pole mount shroud 500. The pole mount shroud 500 may be made of any suitable material including many plastics and metals. The pole mount shroud 500 has a mounting hole 502 in the center to accommodate the hard mounting pole. In this example the shroud of is made of two identical halves 504 which are fixed together. The halves are fixed together with number of interlocking snap-fit tabs 508, although other methods of fixing may be used, as will be understood by those skilled in the art. The shroud half 504 may include a series of ribs 506 to stiffen and strengthen it.

In this example the shroud 500 also includes a number of elastic members 540 to secure the shroud 500 to the cover 200 with a snap or interference fit. In this example the elastic members 540 have a u-shaped cross section. One end 542 of the U-shape is fixed to a base 544 of the elastic member 540. The other end 546 of the U-shape has a tooth 548 and a lip 550 and is free to flex. When the elastic members 540 are pushed into the cover 200 they flex and then the tooth 548 engages on the underside of the cover 200 through the shroud mounting holes 208. The lip 550 prevents the elastic member 540 from being over-inserted into the cover 200. In other examples (not illustrated), the elastic members may be formed differently. For example, the elastic members may be slotted standoffs or posts with barbed tips, or other elastic members as it will be understood by those skilled in the art. In another example, the shroud 500 may be fixed to the cover with conventional fasteners. In another example, the shroud may be fixed to the cover 200 with another type of interference fit, as will be understood by those skilled in the art.

Figure 9:
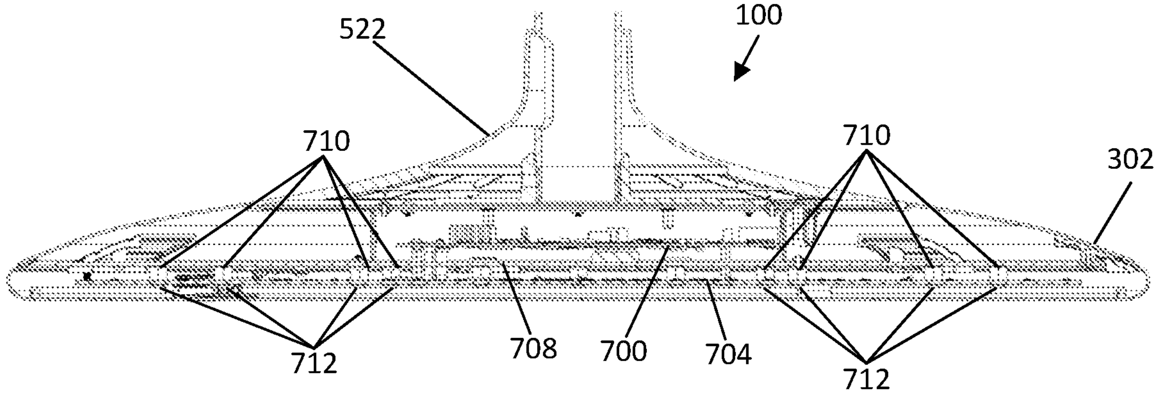
FIG. 9 illustrates a cross-section of an example audio device with a hard mount shroud installed, in accordance with the present disclosure.

FIG. 9 illustrates a cross-section of an example audio device 100 with a hard mount shroud 500 installed. FIG. 9 also illustrates a DSP 700 and a beamforming microphone array 704 installed in the audio device. In this example, the DSP 700 is mounted to the electronics mounting holes 214. The beamforming microphone array 704 is mounted to both the DSP 700 and directly to the cover 200 at a number of peripheral mounting points 302. The illustrated peripheral mounting points 302 are threaded holes, but may take any of the forms described above for the pole mounting holes 204 (e.g., threaded holes, through-holes, studs, pins, standoffs, etc.) as will be understood by those skilled in the art. The microphone array 704 is attached to an intermediate mounting plate 708 by a number of screws 712 attached through standoffs 710.

Figure 10:
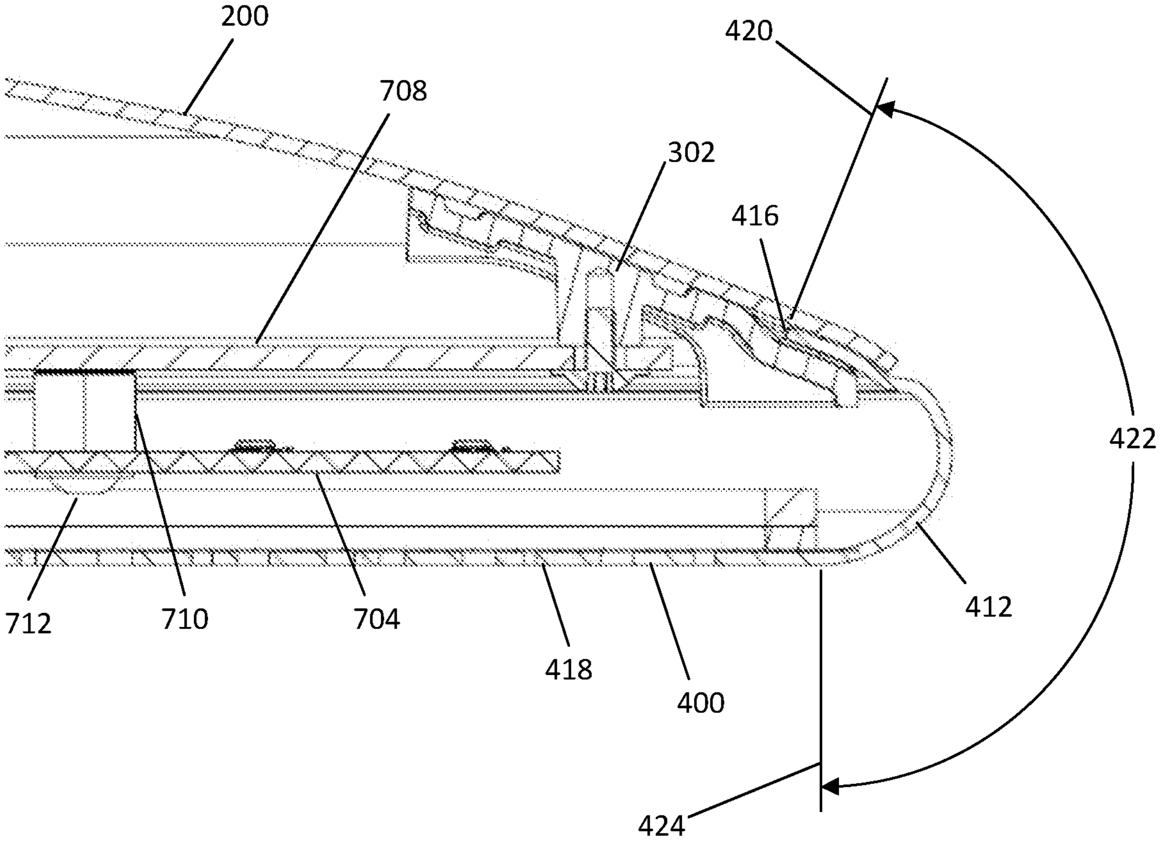
FIG. 10 is an enlarged view of one edge of the audio device shown in FIG. 7, in accordance with the present disclosure.

FIG. 10 is an enlarged view of one edge of the audio device 100 shown in FIG. 9. In the illustrated example the screen 400 has a rounded edge 412. The screen edge 412 forms an overlapping joint 800 with the cover 200. The tip 416 of the edge 412 is captured between the cover 200 and a mounting bracket 300. In this example, the peripheral mounting point 302 is formed as part of the bracket 300, although other arrangements may be possible.

The rounded edge 412 of the screen wraps around so that the tip 416 of the edge 412 is above the bottom surface 418 of the screen 400. Thus, a line 420 perpendicular to the tip 416 of the edge 412 of the screen 400 would form an angle 422 of greater than 90° to vertical 424.

Figure 11:
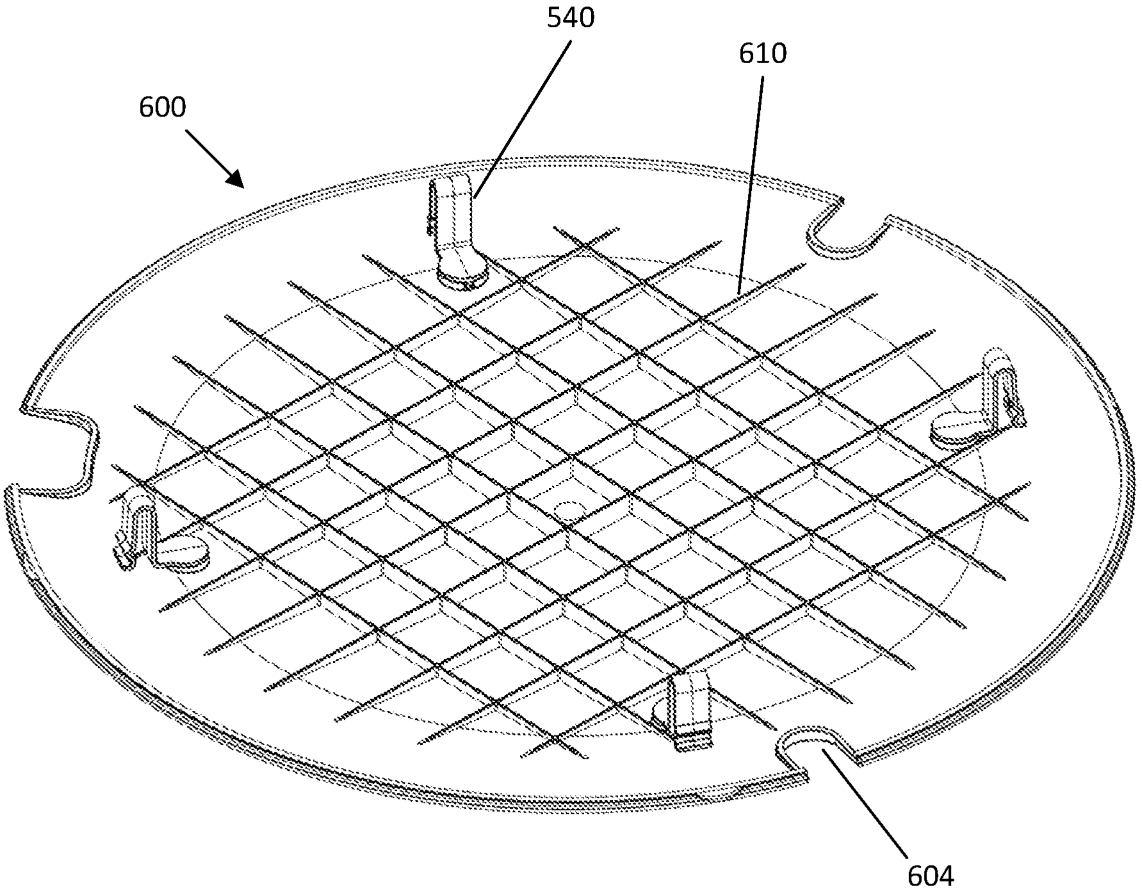
FIG. 11 is an illustration of one example a suspension shroud, in accordance with the present disclosure.
Figure 12:
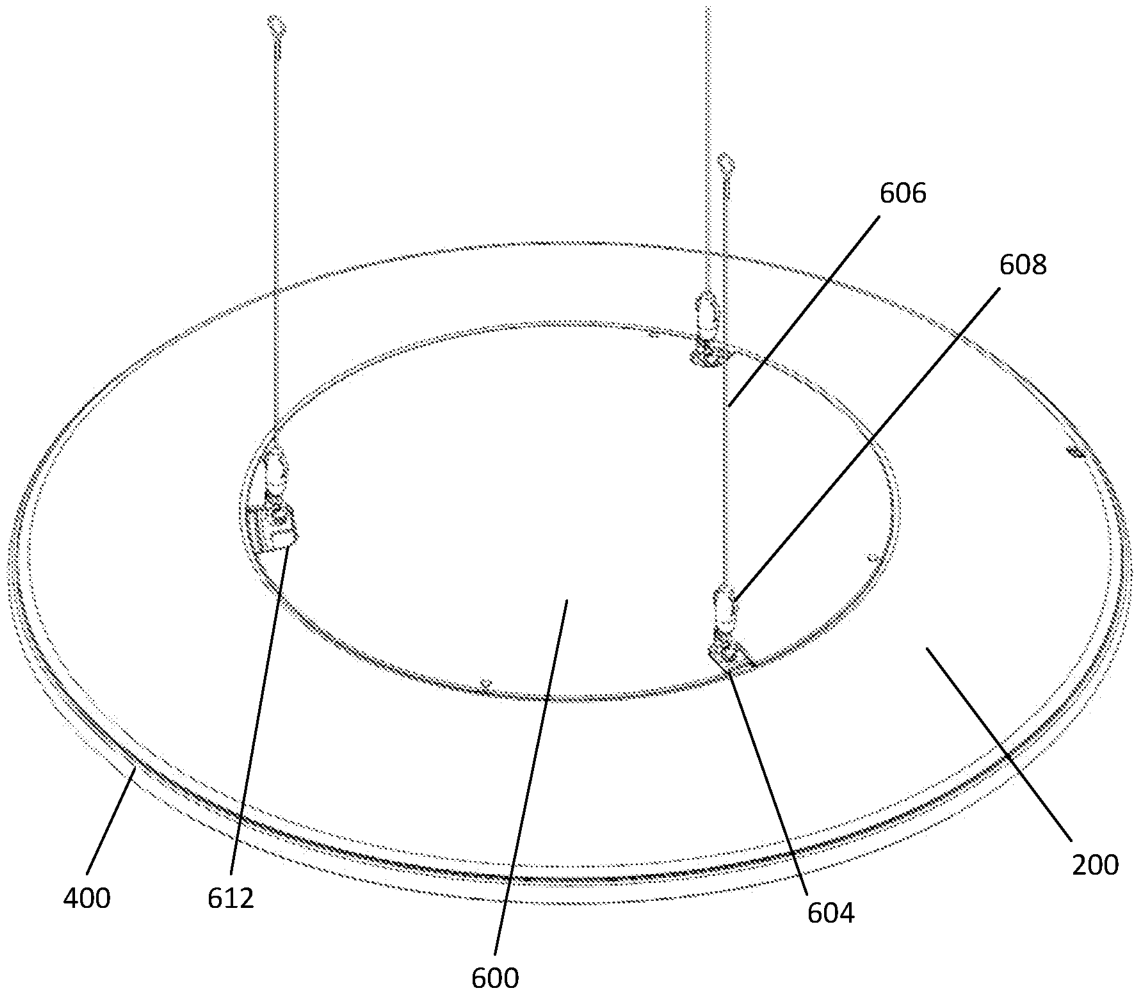
FIG. 12 is an illustration of another example of a ceiling-mounted audio device including a circular cover, circular screen, and a circular suspension shroud, in accordance with the present disclosure.

FIG. 11 is illustration of one example a suspension shroud 600. FIG. 12 is an illustration of another example of a ceiling-mounted audio device 100 including a circular cover 200, circular screen 400, and the circular suspension shroud 600. In this example, the suspension shroud 600 has several slots 604 that allow an equal number of suspension cables 606 to attach to the circular cover 200 via eyelet bolts 608 (FIG. 12).

In this example the shroud has several slots 604 that allow passage of the suspension cables 606 (FIG. 12) and eyelet bolts 608 (FIG. 12) to pass through. The suspension shroud 600 may be made of any suitable material including many plastics and metals. The suspension shroud 600 may also have a series of ribs 610 (FIG. 11) to stiffen and strengthen it. The suspension shroud 600 also includes a cable access hole 612 (FIG. 12) configured to align with the cable access hole 212 in the cover 200 when the audio device 100 is assembled.

As with the pole mount shroud 500, the suspension shroud 600 also includes a number of elastic members 540 (FIG. 11) to secure the suspension shroud 600 to the cover 200 with a snap or interference fit in the same manner as described above. In other examples (not illustrated) the elastic members may be formed differently. For example, the elastic members may be slotted standoffs or posts with barbed tips, or other elastic members as it will be understood by those skilled in the art. In another example, the suspension shroud 600 may be fixed to the cover with conventional fasteners. In other example, the shroud may be fixed to the cover 200 with another type of interference fit, as will be understood by those skilled in the art.

Figure 13:
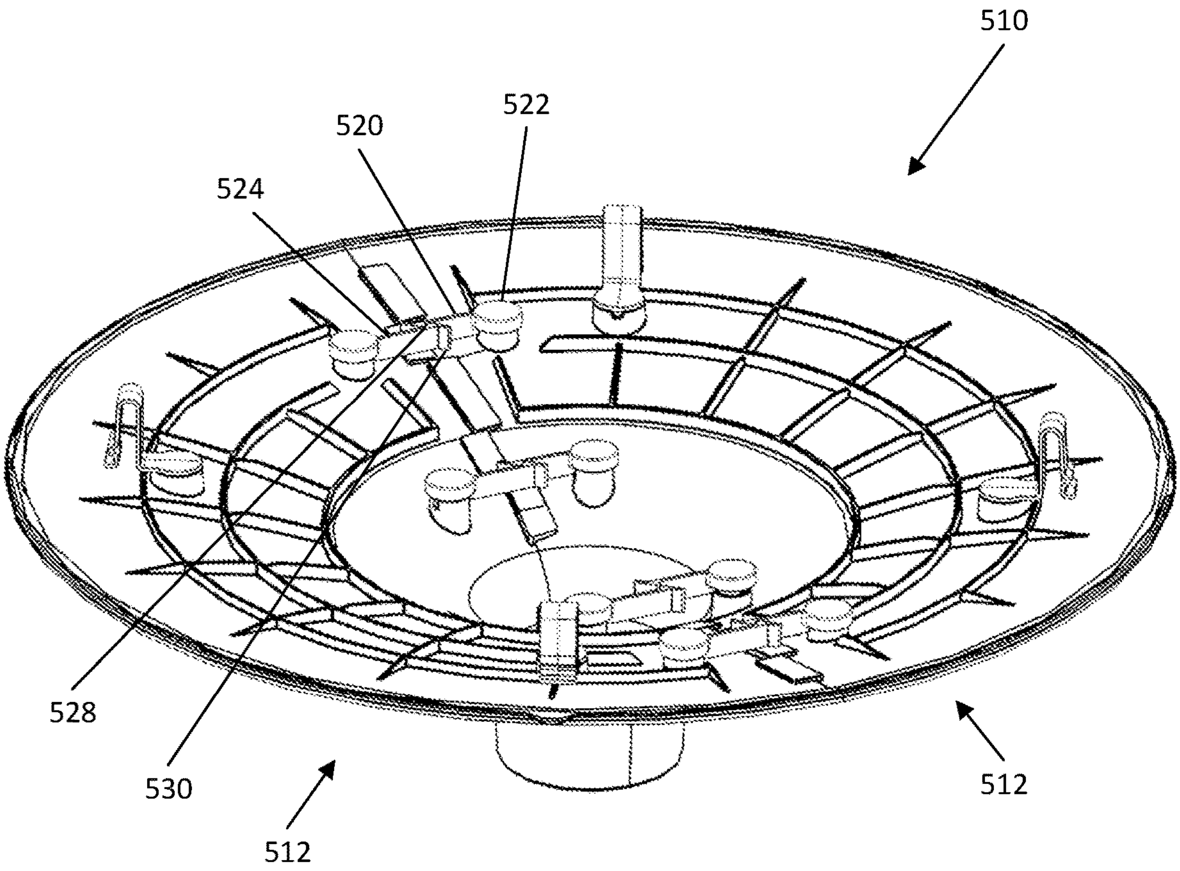
FIG. 13 illustrates another example of a pole mount shroud, in accordance with the present disclosure.

FIG. 13 illustrates another example of a pole mount shroud 510. In this example the two halves 512 are fixed together with clips 520 that hold the halves 504 together and control their orientation relative to each other. Each clip 520 includes a flexible leg 524 connected to a base 522. The flexible leg 524 ends in a tooth 528 and a lead-in 530. To assemble the shroud 500 the base 522 of the clip 520 is fixed to the shroud half 504 and then the two shroud halves 504 are snapped together so that the flexible legs 522 of the clips 520 engage each other at the lead-in 530 and tooth 528. The clip 520 may be fixed by a snap or interference fit, adhesive, welding, or other common fixing means understood to those skilled in the art.

To facilitate an understanding of the principals and features of the disclosed technology, illustrative embodiments are explained below. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It must also be noted that, as used in the specification and the appended claims, the singular forms "a," "an" and "the" include plural referents unless the context clearly dictates otherwise.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The design and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An audio device comprising:

a circular cover comprising a top and a bottom, wherein the top comprises a plurality of mounting holes;

a plurality of brackets fixed to the bottom of the cover, each comprising:

one of a plurality of rotational slots; and a feature configured to support a mounting plate, a circular screen rotationally engaged with the bottom of the cover, the screen comprising a plurality of tabs configured to rotationally engage with the plurality of rotational slots; and a circular shroud removably engaged with the top of the cover;

wherein one bracket of the plurality of brackets is an orientation bracket, wherein the orientation bracket is different than the remaining brackets of the plurality of brackets, and wherein one of the plurality of tabs of the screen is configured to engage only with the rotational slot of the orientation bracket.

2. The audio device of claim 1 wherein the screen further comprises a circular edge, the circular edge comprising a radius, wherein the radius forms an overlapping joint with the cover when the screen is rotationally engaged with the cover.

3. The audio device of claim 2 wherein the radius traverses an angle greater than 90 degrees relative to a plane tangent to a bottom of the screen.

4. The audio device of claim 1 wherein a fastener secures the screen against rotationally disengaging from the cover.

5. The audio device of claim 1 wherein the shroud comprises two removably engaged halves.

6. The audio device of claim 5 wherein the two halves are identical.

7. The audio device of claim 1 wherein the plurality of mounting holes comprises a plurality of holes in a VESA mounting pattern.

8. The audio device of claim 7 wherein the shroud comprises a hole configured to admit a VESA mounting pole.

9. The audio device of claim 7 wherein the plurality of mounting holes further comprises a plurality of cable mounting holes configured in a square pattern having greater spacing than the VESA mounting pattern.

10. The audio device of claim 9 wherein the shroud comprises openings having the same square pattern as the cable mounting holes.

11. The audio device of claim 1 wherein the shroud comprises a plurality of elastic members that removably engage with a subset of the plurality of mounting holes in the top of the cover.

12. The audio device of claim 1 wherein the audio device further comprises a plurality of microphones.

13. The audio device of claim 1 wherein the brackets are fixed to the cover with adhesive.

14. The audio device of claim 1 wherein the brackets are fixed to the cover with fasteners.

15. An audio device kit comprising:

a circular cover comprising a top and a bottom, wherein the top comprises a plurality of mounting holes;

a plurality of brackets fixed to the bottom of the cover, each comprising:

one of a plurality of rotational slots; and a feature configured to support a mounting plate;

a circular screen rotationally engaged with the bottom of the cover, the screen comprising a plurality of tabs configured to rotationally engage with the plurality of rotational slots;

a first circular shroud configured to removably engage with the top of the cover and comprising a hole configured to admit a VESA pole; and a second circular shroud configured to removably engage with the top of the cover in place of the first circular shroud and comprising a plurality of openings configured for a plurality of mounting cables to engage with the top of the cover;

wherein one bracket of the plurality of brackets is an orientation bracket, wherein the orientation bracket is different than the remaining brackets of the plurality of brackets, and wherein one of the plurality of tabs of the screen is configured to engage only with the rotational slot of the orientation bracket.

16. An audio device comprising:

a circular cover comprising a top and a bottom;

a plurality of brackets fixed to the bottom of the cover, each comprising:

one of a plurality of rotational slots, and a feature configured to support a mounting plate;

a circular screen engaged with the bottom of the cover, the screen comprising a plurality of tabs configured to rotationally engage with the plurality of rotational slots;

a beamforming microphone array disposed between the cover and the screen; and a digital signal processor disposed between the cover and the screen;

wherein one bracket of the plurality of brackets is an orientation bracket, wherein the orientation bracket is different than the remaining brackets of the plurality of brackets, and wherein one of the plurality of tabs of the screen is configured to engage only with the rotational slot of the orientation bracket.

* * * * *